United States Patent
Dodson et al.

[11] Patent Number: 5,724,917
[45] Date of Patent: Mar. 10, 1998

[54] CATTLE MATTRESS

[75] Inventors: Robert W. Dodson, LaGrange; Jules A. Haneburger, Newnan, both of Ga.

[73] Assignee: Milliken Research Corporation, Spartanburg, S.C.

[21] Appl. No.: 668,638

[22] Filed: Jun. 21, 1996

[51] Int. Cl.⁶ .................................................. A01K 1/015
[52] U.S. Cl. ..................... 119/526; 119/28.5; 5/420; 441/129
[58] Field of Search ............................... 119/526, 28.5; 5/709, 710, 711, 712, 720, 728, 740; 441/35, 129

[56] References Cited

U.S. PATENT DOCUMENTS

| | | | |
|---|---|---|---|
| 2,081,334 | 5/1937 | Kickenbush. | |
| 2,620,493 | 12/1952 | Brelsford | 5/709 |
| 2,731,652 | 1/1956 | Bishop | 5/710 |
| 3,584,436 | 6/1971 | Gulyas | 54/79.3 |
| 3,968,530 | 7/1976 | Dyson | 5/338 |
| 4,136,412 | 1/1979 | Wilhelm | 5/710 X |
| 4,748,768 | 6/1988 | Jacobsen | 5/740 X |
| 4,835,800 | 6/1989 | Johnson | 5/420 |
| 5,002,014 | 3/1991 | Albin | 119/28.5 |
| 5,023,970 | 6/1991 | Tesch | 5/482 X |
| 5,226,384 | 7/1993 | Jordan | 119/28.5 |
| 5,303,435 | 4/1994 | Haar et al. | 5/420 X |
| 5,388,295 | 2/1995 | Sarkozi | 5/420 X |

FOREIGN PATENT DOCUMENTS

| | | |
|---|---|---|
| WO 86/00781 | 2/1986 | WIPO. |
| 91018542 A1 | 12/1991 | WIPO ............... 54/79.3 |
| WO 94/15452 | 7/1994 | WIPO. |

*Primary Examiner*—Gene Mancene
*Assistant Examiner*—Yvonne R. Abbott
*Attorney, Agent, or Firm*—Terry T. Moyer; Earle R. Marden

[57] ABSTRACT

A cattle mattress made from a woven fabric which is double-woven in areas across the fabric into which crumb rubber is inserted and which are closed off after insertion of the crumb rubber to make a self-contained structure for the comfort of animals.

5 Claims, 1 Drawing Sheet

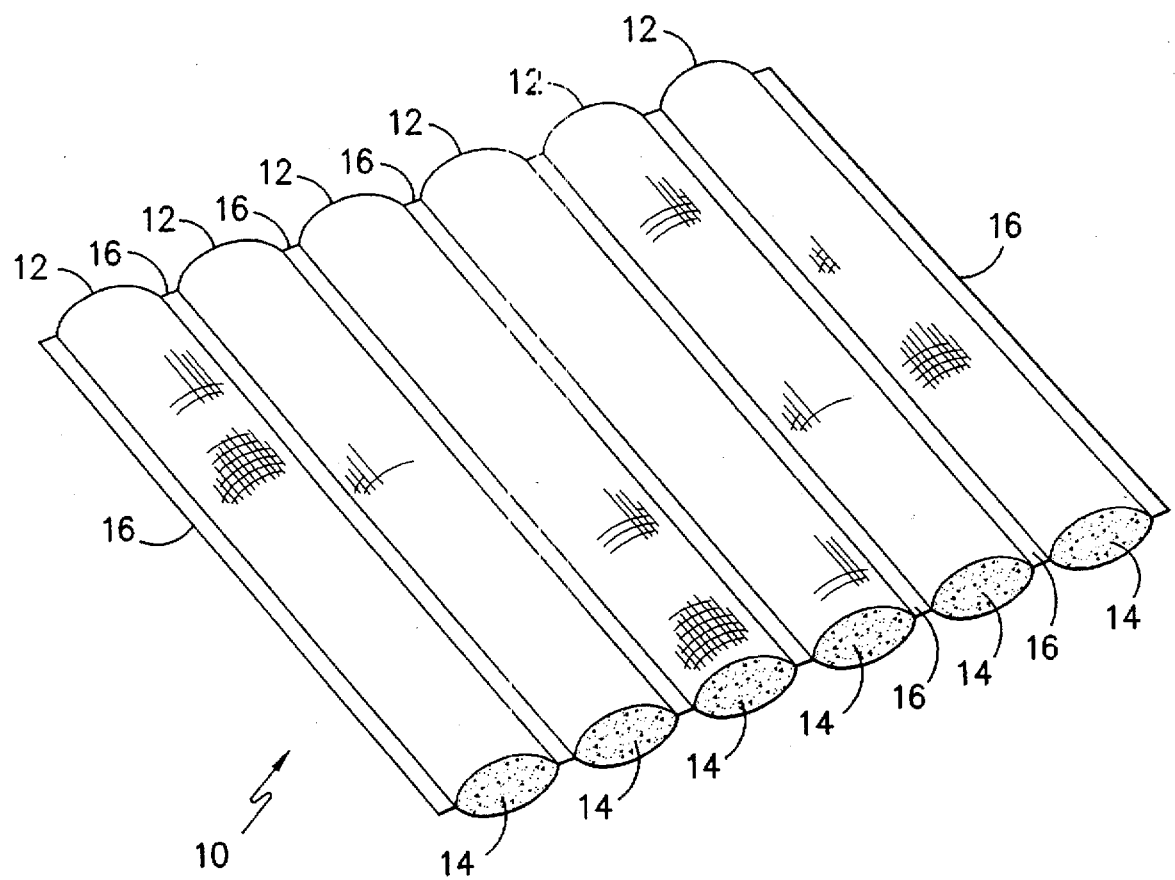

CATTLE MATTRESS

This invention relates to an animal mattress which is particularly intended operatively to be disposed on a concrete or other hard floor within a barn or the like and on which, for example, cows may lie.

After feeding, cows traditionally lie down in the pasture while chewing the cud, and there has hitherto been the problem that during severe winter weather and other periods of inclement weather when the cows are kept in a barn or similar structure the cows are uncomfortable and are not contented when lying down on a concrete or similarly hard floor of the barn. Furthermore, cows nowadays are typically being kept permanently in a barn or similar structure irrespective of the weather conditions. With the view to alleviating this problem various solutions have hitherto been proposed to render the feel of the concrete or similarly hard floor of the barn more akin to that of the pasture. Thus, for example, it has previously been proposed to provide on the floor of the barn bedding materials such as straw, peanut hulls, saw dust, groundpaper, sand or other items available on which the cow lies down. This arrangement has not been fully satisfactory since movement of the cow tends to push the bedding materials within the bag from under the cow. In an alternative proposed solution a layer of comminute rubber from used vehicle tires has been located on the floor in the stall of the barn with a blanket secured over this layer of comminuted rubber and with the cow then lying on top of the blanket. While such a layer of comminuted rubber provides, from the standpoint of the cow, a degree of resiliency and feel which is very similar to that of the pasture, this alternative solution again suffers from the disadvantage that movement of the cow results in the comminuted rubber being displaced from under the cow so that the advantages of the cow lying on the layer of comminuted rubber are no longer achieved.

It is a primary object of the present invention to provide an animal mattress which is operatively disposed on the floor in the stall of a barn and which achieves the advantage of the above-mentioned alternative arrangement comprising a layer of comminuted rubber that the cow lying thereon has a level of comfort comparable to the provided by the pasture, while obviating or mitigating the above-described disadvantage of the previously proposed arrangements.

It is to be emphasized that an animal mattress according to the present invention is not restricted in use to cows lying thereon, and the mattress may be used for other cattle and horses to lie thereon. Furthermore, an animal mattress according to the present invention may also advantageously be used on the floor of, example, a hog breeding area.

In accordance with the present invention there is provided an animal mattress comprising a fabric enclosure having a plurality of separate compartments within the enclosure. Comminuted resiliently deformable material is disposed within each of the compartments.

In order that the invention may be more clearly understood and more readily carried into effect the same will now, by way of example, be more fully described with reference to the accompany drawing in which the Figure One is an isometric view of an animal mattress according to a preferred embodiment of the invention.

Looking now to the drawing, the reference number 10 represents a cattle mattress comprised of a series of tubes 12 filled with crumb rubber 14 to provide comfort to the animal lying thereon. The mattress is a woven fabric with the tubes 12 being double woven and a single layer 16 woven therebetween and at the side of the outer tubes. The ends of the tubes 12 are sealed in conventional manner by sewing or heat sealing.

As mentioned above, the basic fabric is a woven fabric using nylon, polyester or Polypropylene multi- filament yarns in the denier range of 130–300. In the preferred form of the invention the warp yarn is 34/150 polyester yarn and the fill yarn is 34/150 textured polyester.

The cattle mattress 10, as previously stated, is a combination of double woven tubes 12 with single woven areas 16 therebetween and on the sides. The top and bottom layers of the tubes 12 each are woven with 73 ends with a pick count of 35 while the single areas 16 have 146 ends and a pick count of 70. This combination provides the basic woven fabric into which the crumb rubber is inserted to provide comfort and protection to the animals.

The fabric is shipped in its woven form to a customer where it will be cut to length and have one end of each tube dosed by sewing, etc. The crumb rubber will then be inserted into the tubes 12 at the other end and then this end will be dosed to provide a self-contained animal mattress. The mattresses are placed in the stall area of the animal housing and then covered with a heavy textile cover.

It has been found that mattresses of this nature provide comfort which, in the case of cows, will result in an increase in milk production. Furthermore, the described mattress results in less waste handling time and aids in keeping animals cleaner and healthier.

Although we have described in detail the preferred embodiment of the invention, it is contemplated that changes may be made without departing from the scope or spirit of the invention and one desired to be limited only by scope of the claims.

We claim:

1. A cattle mattress comprising a woven fabric having areas of double weave forming tubes, a layer of single weave fabric between the formed tubes, soft particulate material in said formed tubes and means closing the ends of said tubes to prevent the escape of the particulate material.

2. The mattress of claim 1 whereas said particulate material is crumb rubber.

3. The mattress of claim 1 wherein said woven fabric is substantially all polyester.

4. The mattress of claim 3 wherein the fill yarn of said woven fabric is textured.

5. The method of making a cattle mattress comprising the steps of: weaving a fabric having areas of double weave to form tubes therein, providing areas of single weave between the tubes, closing off one end of each tube, filling each tube with crumb rubber and closing off the other end of each tube to prevent the escape of crumb rubber from the tubes.

* * * * *